United States Patent [19]

Chiao et al.

[11] Patent Number: 4,788,267

[45] Date of Patent: Nov. 29, 1988

[54] BASE-CATALYZED, LOW TEMPERATURE SELF-CROSSLINKING POLYMERS

[75] Inventors: Wen B. Chiao; Carmine P. Iovine, both of Bridgewater; Samuel Gold, Watchung, all of N.J.

[73] Assignee: National Starch and Chemical Corporation, Bridgewater, N.J.

[21] Appl. No.: 13,151

[22] Filed: Feb. 10, 1987

Related U.S. Application Data

[63] Continuation of Ser. No. 764,165, Aug. 9, 1985, abandoned.

[51] Int. Cl.[4] .................... C08F 228/02; C08F 226/04
[52] U.S. Cl. .................... 526/287; 526/292.2; 526/295; 526/296; 526/307; 526/310
[58] Field of Search .............. 526/287, 292.2, 292.95, 526/307, 295, 296, 310

[56] References Cited

U.S. PATENT DOCUMENTS

| | | |
|---|---|---|
| Re. 28,543 | 9/1975 | Boothe et al. . |
| 3,011,918 | 5/1959 | Silvernail et al. . |
| 3,095,390 | 6/1963 | Maeder . |
| 3,486,932 | 12/1969 | Schaper et al. . |
| 3,694,393 | 9/1972 | Lewis et al. .......................... 524/815 |
| 4,060,679 | 11/1977 | Naarmann ............................ 526/304 |
| 4,235,986 | 11/1980 | Catena ................................. 526/320 |
| 4,431,787 | 2/1984 | Werber ................................ 526/240 |
| 4,710,526 | 12/1987 | Tokumoto et al. ............... 526/292.2 |

OTHER PUBLICATIONS

"SIPOMER ® CHPM", Brochure by Alcolac Technical Data.

*Primary Examiner*—Christopher Henderson
*Attorney, Agent, or Firm*—Margaret B. Kelley; Edwin M. Szala

[57] ABSTRACT

A self-crosslinking polymer consisting essentially of at least 1 mole % of a halohydrin monomer, at least 1 mole % of a tertiary or secondary amine salt monomer, and 0–98 mole % of a vinyl polymerizable monomer other than the halohydrin or amine salt monomers crosslinks, in the presence of a base, at a lower temperature than a polymer without the tertiary or secondary amine salt monomer. Typical polymers contain 3-chloro-2-hydroxypropyl acrylate or methacrylate; diallylamine hydrochloride, N-isopropyl methacrylamide hydrogen sulfate, dimethylaminopropyl methacrylamide, or dimethylaminoethyl methacrylate hydrochloride or acetate; and optionally other monomers such as a vinyl ester, an acrylate, or a dialkyl diallyl ammonium chloride. When the polymers contain a conductive cationic monomer such as dimethyl diallyl ammonium chloride, they are useful as electroconductive coatings for paper substrates. An adduct of epichlorohydrin and dimethylaminopropyl methacrylamide or dimethylaminoethyl methacrylate may be used in place of the 3-chloro-2-hydrodxypropyl acrylate or methacrylate for the electroconductive coatings.

13 Claims, No Drawings

BASE-CATALYZED, LOW TEMPERATURE SELF-CROSSLINKING POLYMERS

This application is a continuation of application Ser. No. 764,165, filed Aug. 9, 1985, now abandoned.

BACKGROUND OF THE INVENTION

This invention relates to base-catalyzed self-crosslinking polymers which can be cured at low temperatures. It also relates to the use of water-soluble cationic, base-catalyzed self-crosslinking polymers as electroconductive coatings for paper substrates.

It is well-known in the art to employ self-crosslinking polymers, either in emulsion or solution form, as coatings, binders, or adhesives for a variety of substrates. Self-crosslinking polymers are distinguished from crosslinkable polymers in that the cross-linkable polymers contain a functionality, such as a carboxyl group, which can only be crosslinked by the addition of a co-reactant (i.e., crosslinker) to the polymer emulsion or solution. A typical crosslinkable system can be represented as follows:

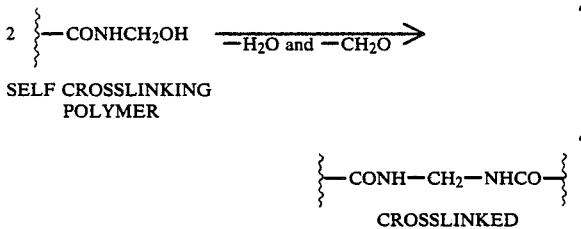

In contrast, self-crosslinking polymers contain a functionality which is self-reactive and consequently do not require the use of a co-reactant species per se. A typical system can be represented as follows:

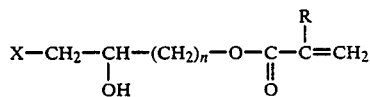

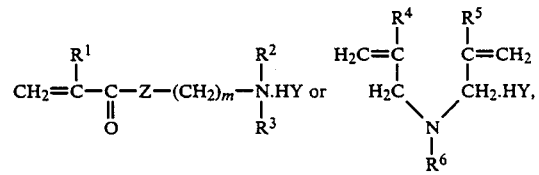

The advantages of self-crosslinking polymer systems are their simplicity, economy, and particularly their efficiency. Such systems have been used as textile adhesives, non-woven binders, pigment binders for glass fabrics, and fabric finishing agents for hand and weight modification. On curing, such systems produce textile products with excellent durability to washing and dry cleaning. They have also been used in pigment printing and dyeing and as a binder for paper.

Most of the self-crosslinking and co-reactant cross-linkable polymer systems of the prior art suffer from the disadvantage that toxic, free formaldehyde is present either during the curing or the preparation of the polymers. The self-crosslinking systems, which are typically formaldehydeamide polymeric adducts containing methylolacrylamide repeating units, liberate formaldehyde during curing of the crosslinked thermoset polymer. The crosslinkable systems, which are typically based on urea-formaldehyde or melamine-formaldehyde resins and crosslinkers, may contain residual free formaldehyde. In addition to the odor problems created by the presence of free formaldehyde, the dermatitic effect may present a serious problem. The exposure of operating personnel and consumers to formaldehyde has been a recent concern of both industry and regulatory agencies.

A further disadvantage of the above self-crosslinking systems is that they require an acidic cure. When used as electroconductive coatings on paper substrates, the acid tends to degrade the paper and cause yellowing.

This has lead to the search for formaldehyde-free systems, especially formaldehyde-free self-crosslinking systems which can be crosslinked at low temperatures, preferably at room temperature, by the addition of a base rather than an acid.

SUMMARY OF THE INVENTION

The base-catalyzed, low temperature self-crosslinking polymers herein consist essentially of (a) at least 1 mole % of a halohydrin monomer, (b) at least 1 mole % of a tertiary or secondary amine salt monomer, and (c) 0–98 mole % of a vinyl polymerizable monomer other than (a) or (b), with the mole percentages totaling 100%, wherein the polymer crosslinks, in the presence of the base, at a lower temperature than a polymer without (b). The halohydrin monomer may have the formula

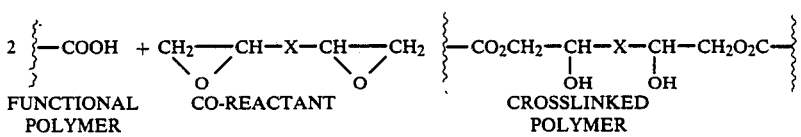

and the amine salt monomer may have the formula $$CH_2=C(R^1)-C(=O)-Z-(CH_2)_m-N(R^3).HY \text{ or } \begin{array}{c} H_2C=C(R^4) \\ H_2C \end{array} \begin{array}{c} C(R^5)=CH_2 \\ CH_2.HY, \\ N-R^6 \end{array}$$

where R and $R^1$ are independently H or $CH_3$; $R^2$ is hydrogen when $R^3$ is a lower alkyl, or $R^3$ is hydrogen when $R^2$ is a lower alkyl, or $R^2$ and $R^3$ are independently a lower alkyl, preferably a $C_1$–$C_4$ linear alkyl, most preferably methyl; $R^4$, $R^5$ and $R^6$ are independently hydrogen or a lower alkyl, preferably a $C_1$–$C_4$ linear alkyl, most preferably methyl; n and m are 1–5, preferably n=1 and m=2 or 3; X is chlorine, bromine, or iodine, preferably chlorine; Z is —NH— or —O—; HY is an organic or inorganic acid.

The resulting polymer chain will contain the following units:

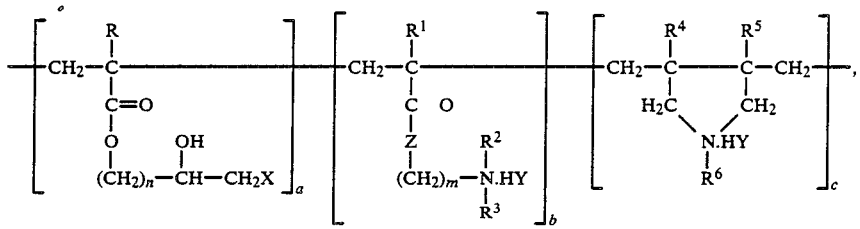

where a+b, a+c, or a+b+c is 1 or less.

The polymers offer excellent shelf life under acidic or neutral conditions but cure rapidly at low temperatures, in some cases at room temperature, under basic conditions to give high performance products such as adhesives, sealants, coatings, antistatic additives, and wet strength additives for paper.

The cure is carried out by adding any inorganic or organic base such as a conventional alkali (e.g., sodium hydroxide), alkaline earth salt (e.g., sodium sesquicarbonate), or amine (e.g., triethyl or tributylamine). The base used should be soluble in the polymerization medium. For example, alkalies or alkaline earth salts are used with aqueous solutions or emulsions and amines are used with organic solvents.

An electroconductive coating for a paper substrate consists essentially of an aqueous solution of a cationic, self-crosslinking, alkaline-curable polymer and an alkali or alkaline earth salt; the polymer consisting essentially of (a) of at least about 70 mole % of a non-crosslinking, cationic quaternary ammonium salt monomer, (b) at least about 1 mole % of a halohydrin-containing monomer, (c) at least about 1 mole % of a secondary or tertiary amine salt monomer, and (d) 0–28% of a vinyl polymerizable monomer other than (a), (b), or (c), with the mole percentage totaling 100%; wherein the polymer crosslinks, in the presence of an alkali or alkaline earth salt, at a lower temperature than a polymer without the amine salt. The preferred coating consists essentially of 70–97% of the non-crosslinking, cationic quaternary ammonium salt monomer which has the formula

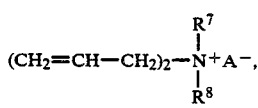

where $R^7$ is a $C_1$–$C_{18}$ alkyl group, $R^8$ is $R^7$ or β-propionamido, and A is an anion; 2–20 mole % of the halohydrin-containing monomer which has the formula

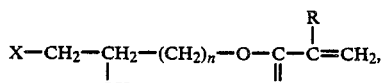

where X is chlorine, bromine, or iodine and R is hydrogen or $CH_3$; and 1–10 mole % of the amine salt monomer which has the formula

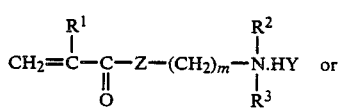

or

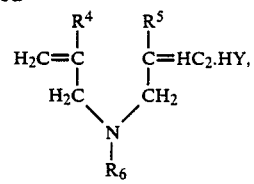

where $R^1$ is hydrogen or $CH_3$, $R^2$ is hydrogen when $R^3$ is a lower alkyl, or $R^3$ is hydrogen when $R^2$ is a lower alkyl, or $R^2$ and $R^3$ are independently a lower alkyl; $R^4$, $R^5$, and $R^6$ are independently hydrogen or a lower alkyl; n and m are 1–5; Z is —NH— or —O—; and HY is an organic or inorganic acid. The preferred coating consists essentially of 70–97% of the non-crosslinking, cationic quaternary ammonium salt monomer which has the formula

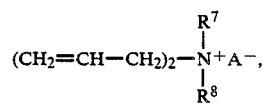

where $R^7$ is a $C_1$–$C_{18}$ alkyl group, $R^8$ is $R^7$ or propionamido, and A is an anion; 2–20 mole % of the halohydrin monomer which has the formula

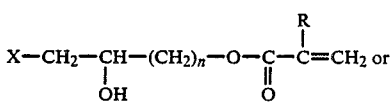

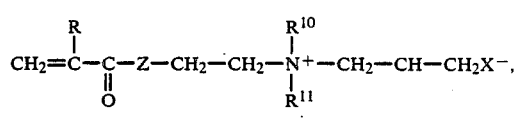

where X is chlorine, bromine, or iodine and R is hydrogen or $CH_3$, Z is —NH— or —O—, and $R^{10}$ and $R^{11}$ are independently a $C_1$–$C_{18}$ alkyl group; and 1–10 mole % of the amine salt monomer which has the formula

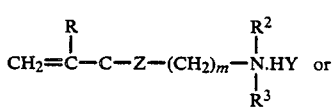

or

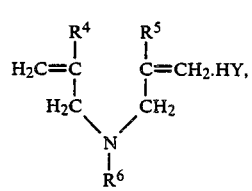

where $R^1$ is hydrogen or $CH_3$, $R^2$ is hydrogen when $R^3$ is a lower alkyl, or $R^3$ is hydrogen when $R^2$ is a lower alkyl, or $R^2$ and $R^3$ are independently a lower alkyl; $R^4$, $R^5$, and $R^6$ are independently hydrogen or lower alkyl; n and m are 1-5; Z is —NH— or —O—; and HY is an organic or inorganic acid. In the most preferred coating the non-crosslinking, cationic monomer is dimethyldiallyl ammonium chloride, the halohydrin-containing monomer is 3-chloro-2-hydroxypropyl acrylate or methacrylate, and the amine salt monomer is dimethylaminopropyl methacrylamide or dimethylaminoethyl methacrylate.

DESCRIPTION OF THE PREFERRED EMBODIMENTS

For use herein the polymers must contain the self-crosslinking halohydrin monomer and at least one of the secondary or preferably tertiary amine salt monomers. Suitable halohydrin monomers include 3-halo-2-hydroxyalkyl acrylates or methacrylates (e.g., 3-chloro-2-hydroxypropyl acrylate or methacrylate) and similar vinyl monomers containing adjacent hydroxyl and halide groups, such as 3-chloro-2-hydroxypropyl vinyl ether and N-3-chloro-2-hydroxypropyl-N,N-diallylamine.

The amine salt monomers useful herein include those containing one or two vinyl polymerizable groups. The former include the hydrogen acid salts of a basic ester having the formula

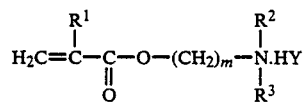

or of a basic amide having the formula

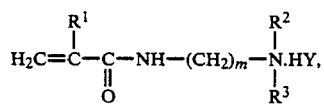

where $R^1$, $R^2$, $R^3$ and m are as defined previously and Y is $Cl^-$, $Br^-$, $RCO_2^-$, $NO_3^-$, $SO_4^{--}$, or like anions derived from inorganic or organic acids. Typical monomers include the hydrochloride of dimethylaminopropyl methacrylamide, hydrochloride of dimethylaminoethyl methacrylate, and acetate salt of dimethylaminoethyl methacrylate. The latter have the general formula

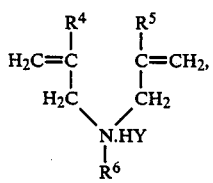

where $R^4$, $R^5$, $R^6$ and Y are as defined previously.

Optional monomers suitable for use with the above halohydrin and amine salt monomer(s) include vinyl polymerizable monomers such as the vinyl esters of up to $C_6$ saturated aliphatic monocarboxylic acids such as vinyl acetate; esters of (meth)acrylic acid with $C_1$-$C_{18}$ alcohols, including $C_1$-$C_{18}$ alkanols, benzyl alcohol, cyclohexyl alcohol, and isobornyl alcohol, such as methyl, ethyl, butyl, 2-ethylhexyl, or octadecyl acrylate or methacrylate; (meth)acrylamide and the N-substituted derivatives thereof, such as N-mono and N-dimethyl, -ethyl, -propyl, and butyl acrylamide or methacrylamide and N-mono- or di-phenyl acrylamide; vinyl ethers such as butyl vinyl ether; N-vinyl lactams such as N-vinyl pyrrolidinone; halogenated vinyl compounds such as vinyl chloride and vinylidene chloride or flouride; alkyl vinyl ketones such as methyl or ethyl vinyl ketones diesters of α,β-unsaturated dicarboxylic acids such as dimethyl, diethyl, dipropyl, dibutyl, diphenyl, dibenzyl, and di(phenylethyl)itaconate, maleate, and fumarate; (meth)allyl esters of saturated aliphatic monocarboxylic acids, such as allyl and methallyl acetates, propionates, and valerates; vinyl compounds such as vinyl pyrrole; styrene, vinyl toluene, and α-methyl styrene; and olefins such as ethylene. The optional comonomer may be used in amounts up to about 98 mole %, preferably about 65-98 mole %, and most preferably above about 90 mole %. Any comonomer is suitable and the one selected will depend upon the desired end use. Minor amounts (e.g., 0.01-2%) of crosslinking monomers such as diallyl maleate and triallyl cyanurate are also useful herein.

If the end use is an electroconductive coating for paper substrates and a cationic polymer is used therein, a non-crosslinking, cationic monomer must be present in the polymer in amounts of at least about 70 mole %, and the resulting polymer must be water-soluble. Suitable monomers include (a) the quaternary ammonium salts derived from dialkyl diallyl amines which have the formula

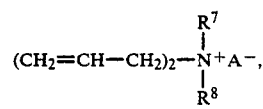

where $R^7$ is a $C_1$-$C_{18}$ alkyl group, $R^8$ is $R^7$ or propionamido and A is an anion, (e.g., dimethyl diallyl ammonium chloride or diallyl methylpropionamido ammonium chloride); (b) the quaternary ammonium salts derived from N,N-dialkyl aminoalkyl acrylates or methacrylates which have the formula

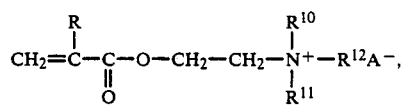

where $R^9$ is hydrogen or $CH_3$ and $R^{10}$, $R^{11}$, and $R^{12}$ are independently a $C_1$-$C_{18}$ alkyl group and A is an anion, (e.g., methacryloxyethyl trimethyl ammonium methosulfate); (c) quaternary ammonium salts derived from N,N-dialkyl aminoalkyl acrylamides and methacrylamides which have the formula

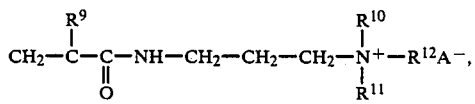

where $R^9$-$R^{12}$ and A are as defined above, (e.g., methacrylamidopropyl trimethyl ammonium chloride); (d) quaternary ammonium salts derived from N,N-dialkyl-2-hydroxypropyl alkyl acrylates or methacrylates which have the formula

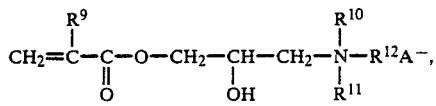

where $R^9$–$R^{12}$ are as defined above, (e.g., methacryloxy-2-hydroxypropyl trimethyl ammonium chloride); and (e) vinylbenzyl quaternary ammonium salts which have the formula

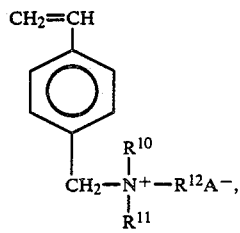

where $R^{10}$–$R^{12}$ and A are defined above (e.g., vinylbenzyl trimethyl ammonium chloride). Suitable anions include fluoride, bromide, hydroxide, nitrate, acetate, sulfate, methosulfate or phosphate. The preferred monomer is dimethyl diallyl ammonium chloride.

The first group of electroconductive monomers are described in U.S. Pat. No. 3,544,318 issued Dec. 1, 1970 to J. E. Boothe et al., which was reissued Sept. 2, 1975 as Re. 28,543. The second and third group of electroconductive monomers are described in U.S. Pat. No. 3,468,932 issued Dec. 30, 1969 to R. J. Schaper et al. The fifth class of electroconductive monomers is described in U.S. Pat. No. 3,011,918 issued Dec. 5, 1961 to L. H. Silvernail et al.

For the electroconductive polymer, the halohydrin-containing monomer which can be used with the above non-crosslinking, cationic quaternary ammonium monomer may be the non-ionic monomers having the formula

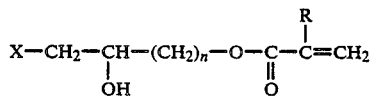

described previously (e.g., 3-chloro-2-hydroxypropyl acrylate or methacrylate) or a cationic monomer having the formula

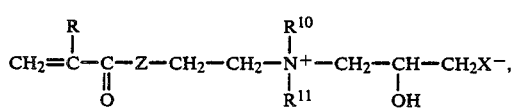

where R, Z, $R^{10}$, $R^{11}$ and X are as defined previously (e.g., the adduct of epichlorohydrin and dimethylaminopropyl methacrylamide or dimethylaminoethyl methacrylate.). These cationic halohydrin-containing monomers are described in U.S. Pat. No. 3,095,390 issued June 25, 1963 to A. Maeder (which covers the monomer where Z is —NH—) and U.S. Pat. No. 3,694,393 issued Sept. 26, 1972 to S. N. Lewis (which covers the monomer where Z is —O—).

The polymers may be prepared by known solution, emulsion, or suspension polymerization techniques using the appropriate amount of monomer. The amine monomers, however must be in the salt form, either as organic or inorganic salts, during the polymerization. The conventional initiators useful herein include azo compounds (e.g., 2,2'-azobisisobutyronitrile); peroxides (e.g., benzoyl peroxides, hydrogen peroxides and t-butyl peroxide or hydroperoxide); peresters (e.g., ammonium, sodium and potassium persulfate); and redox systems (e.g., sodium persulfate with potassium bisulfite or ammonium persulfate with sodium thiosulfate). They are employed in known catalytic amounts, typically from about 0.01% to about 5% by weight, based on the weight of the total reaction mixture. Known polymerization additives, such as surfactants, may be used if desired. The surfactants used should be compatible with the monomers.

In general, the preparation of the polymers herein may be conducted at any temperature which will be high enough so as to result in an adequate reaction rate. In addition, the length of the reaction period will depend, for the most part, on the specific monomer(s) which are utilized. Thus, it is a matter of ordinary preparative experience on the part of the practitioner to determine the precise combination of time and temperature which will be best suited for the preparation of polymers containing these functional monomers.

The polymers herein cure by a crosslinking mechanism which is not completely understood but which is believed to involve a reaction between the halogen atom and the amine to form a quaternary ammonium halide.

For example, when the recurring units are a and b, the proposed crosslinking mechanism can be depicted as follows:

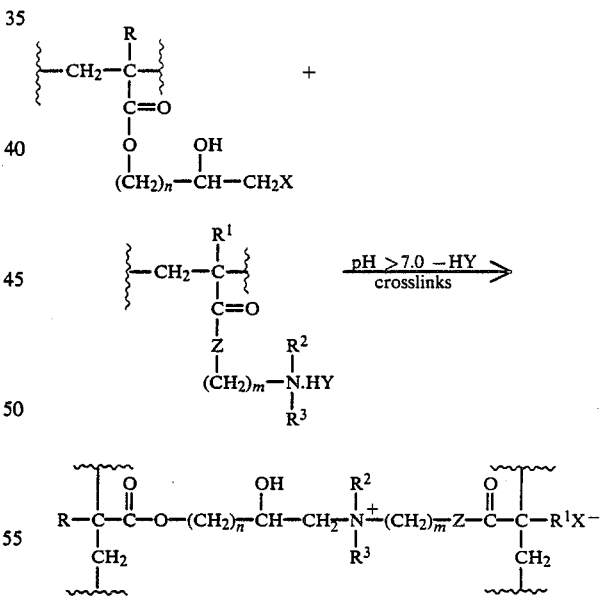

In the examples which follow, all parts and percentages are given by weight and all temperatures are in degrees Celsius unless otherwise noted. Intrinsic viscosities (IV) were measured in the indicated solvent. The following tests were used to evaluate the paper coated with the electroconductive polymers:

SURFACE ELECTRICAL RESISTIVITY

An aqueous solution of the polymer to be tested is prepared and coated onto a 6 in. by 6 in. square of paper suitable for applying electroconductive coatings by means of a Meyer wire-wound draw rod. The coated paper is dried in a forced air oven for 2 minutes at 93° C. (200° F.). The dried paper is placed in a controlled environmental chamber at the indicated relative humidity (i.e., 20%, 50%, and 80% RH) and conditioned overnight (about 16 hours). The conditioned paper is then placed with the coated side under the electrodes of a SER fixture which consists of two stainless steel electrodes 0.75 in. wide separated by a 2.5 in. block of teflon weighted down with a 500 g. brass rod 2 in. in diameter by 2.25 in. in length. The electrical current passing across the surface, i.e., surface resistivity, of the sheet is read using a Keithley 620 Electro meter set on the scale to read ohms.

TOLUENE HOLDOUT

Tappi Provisional Method T 528 PM-74 was used to determine the relative toluene holdout of the electroconductive base paper. Many of the functional properties of the electrophotographic base paper are related to its degree of solvent holdout. For example, the side to be coated by zinc oxide from a solvent solution must have a required degree of holdout to achieve optimum electrophotographic response. Also, in a liquid toner copying system, the opposite side must have solvent holdout sufficient to prevent excess toner absorption. This test measures these relative solvent holdout properties.

SURFACE TACK AND REMOISTENABILITY

The surface tack was evaluated by conditioning electroconductive coated paper overnight at 80% relative humidity, removing the conditioned paper, and immediately finger testing for surface tack. The remoistenability was evaluated by conditioning the electroconductive coated paper at 50% RH overnight, placing 5 drops of water on the conductive surface, and after 1 minute blotting water and finger testing for surface tack. The tack was rated as follows:

| Number Rating | Performance | Tack |
| --- | --- | --- |
| 10 | Perfect | Lowest |
| 9 | Excellent | ↓ |
| 8 | Very Good | ↓ |
| 7 | Good-Very Good | ↓ |
| 6 | Good | ↓ |
| 5 | Fair-Good | ↓ |
| 4 | Fair | ↓ |
| 3 | Poor-Fair | ↓ |
| 2 | Poor | ↓ |
| 1 | Very Poor | ↓ |
| 0 | None | Highest |

EXAMPLE I

This example describes the preparation of an aqueous solution polymer of 3-chloro-2-hydroxypropyl acrylate(CHPA)/hydrochloride of dimethylaminopropyl methacrylamide(DMAPMA.HCL)/dimethyl diallyl ammonium chloride (DMDAAC) (15/10/75 molar ratio).

The following charges were prepared:

I—383 g. (1.50 moles) of dimethyl diallyl ammonium chloride (DMDAAC) in 200 g. of water
II—49.5 g. (0.3 mole) of 3-chloro-2-hydroxypropyl acrylate (CHPA)
III—34.0 g. (0.2 mole) of dimethylaminopropyl methacrylamide (DMAPMA) and 19.7 g. (0.2 mole) of hydrogen chloride (37% HCl) in 130 g. of water
IV—4.5 g. ammonium persulfate $(NH_4)_2S_2O_8$ in 50 g. of water Thirty percent (30%) of charge I and 10% of charges II, III, and IV were each charged to a 1 l. round bottom flask fitted with a stainless steel agitator, condenser, thermometer, nitrogen inlet adapter, and three addition funnels. The initial charge was purged with nitrogen for 30 min. The internal temperature was then raised to 65°–70° C. After holding for 30 min. at 65°–70° C., the remainder of the charges were slowly and separately added over 2 hr. The mixture was maintained at 65°–75° C. for 2 hr. after completion of the slow addition. The pH was then adjusted to 5.0–5.5 with a 10% aqueous sodium hydroxide and the solution was cooled to room temperature. The final solution contained 38% polymer solids. The solution was stable for over 6 months at room temperature and there was no gel formation.

Using the above procedure additional polymers (designated B-F) were prepared using the above monomers, as well as the hydrochloride of dimethylaminoethyl methacrylate (DMAEMA.HCl), 3-chloro-2-hydroxypropyl methacrylate (CHPMA), 2-acrylamido-2-methylpropane sulfonic acid (AMPS), N-(2-methacryloyl ethyl)trimethyl ammonium chloride (Sipomer Q-5 available from Alcolac Corporation, Baltimore, MD), and acrylamide (AM).

The polymer composition, intrinsic viscosity (I.V.) in 1N KCl, and gel time at 25° C. after adjustment to pH 9.5 with 10% aqueous sodium hydroxide are summarized below.

| | Polymer | | Gel |
| --- | --- | --- | --- |
| Designation | Composition (mole %) | I.V. (dl/g.) | Time (min.) |
| A | CHPA/DMAPMA.HCl/DMDAAC (15/10/75) | 0.36 | 165 |
| B | CHPMA/DMAPMA.HCl/DMDAAC (2/2/96) | 0.65 | 15 |
| C | CHPA/DMAPMA.HCl/AMPS (2/2/96) | 0.85 | 90 |
| D | CHPMA/DMAEMA.HCl/Sipomer Q-5 (12/17/71) | 0.45 | 45 |
| E | CHPMA/DMAPMA.HCl (5/95) | 0.52 | <5 |
| F | CHPMA/DMAPMA.HCl/AM (10/25/65) | 0.85 | <5 |

The results show that all the polymers gelled at room temperature after the pH adjustment, an indication that they had crosslinked at this low temperature.

EXAMPLE II

This example demonstrates the improved crosslinking achieved when the amine salt monomer is present in the aqueous solution polymer.

The polymers designated G-L were prepared using the aqueous solution polymerization technique of Example I; they contained the halohydrin monomer (CHPA or CHPMA) and various tertiary amine salt monomers including those of Example I as well as diallylamine hydrochloride (DAA.HCl) N-isopropylaminopropyl methacrylamide hydrogen sulfate (N-IPAPMA.$H_2SO_4$), and acrylic acid (AA). The polymers designated K, L-1, and L-2 contained secondary amine salt monomers rather than tertiary amine salt monomers. Comparative polymers M-P contained only the halohydrin monomer, whereas Q and R contained only the tertiary amine salt monomer. The 30% polymer solutions were cured by adjusting the pH to 9.5 with 15% sodium sesquicarbonate. The gel time at 25° C. is shown below.

| Designation | Composition (mole %) | I.V. | Gel Time |
|---|---|---|---|
| Polymer | | | |
| G-1 | CHPA/DMAPMA.HCl/DMDAAC (6/6/88) | 0.50 | 6.25 hr. |
| G-2 | CHPA/DMAPMA.HCl/DMDAAC (7/6/87) | N.D. | 0.75 hr. |
| G-3 | CHPA/DMAPMA.HCl/DMDAAC (12/7/81) | N.D. | 4.25 hr. |
| G-4 | CHPA/DMAPMA.HCl/DMDAAC (15/10/75) | N.D. | 2.75 hr. |
| G-5 | CHPA/DMAPMA.HCl/DMDAAC (20/10/70) | N.D. | 2.00 hr. |
| H-1 | CHPA/DMAEMA.HCl/DMDAAC (4/3/93) | N.D. | 6.25 hr. |
| H-2 | CHPA/DMAEMA.HCl/DMDAAC (6/6/88) | 0.58 | 4.25 hr. |
| I-1 | CHPMA/DMAPMA.HCl/DMDAAC (3/2/94) | N.D. | 6.25 hr. |
| I-2 | CHPMA/DMAPMA.HCl/DMDAAC (3/6/91) | 0.51 | 3.50 hr. |
| J-1 | CHPMA/N—MDAA.HCl/DMDAAC (3/4/93) | N.D. | 20.00 hr. |
| J-2 | CHPMA/N—MDAA.HCl/DMDAAC (6/10/84) | 0.36 | 2.00 hr. |
| K | CHPA/DAA.HCl/DMDAAC (6/10/84) | N.D. | 36 hr. |
| L-1 | CHPMA/N—IPAPMA.H$_2$SO$_4$/DMDAAC (6/10/84) | N.D. | 72 hr. |
| L-2* | CHPMA/N—IPAPMA.H$_2$SO$_4$/DMDAAC (6/10/84) | 0.315 | N.D. |
| Comparative Polymers | | | |
| M | CHPA/DMDAAC (7/93) | 0.35 | Did not gel |
| N | CHPMA/DMDAAC (7/93) | N.D. | Did not gel |
| O | CHPA/DMDAAC/HEMA (6/88/6) | 0.43 | Did not gel |
| P | CHPA/DMDAAC/AA (6/88/6) | 0.34 | Did not gel |
| Q | DMAPMA.HCl/DMDAAC (7/93) | 0.33 | Did not gel |
| R | N—MDAA.HCl/DMDAAC (7/93) | 0.27 | Did not gel |
| S | DMDAAC (100) | N.D. | Did not gel |

*40.3% solids instead of 30% solids.
N.D. — not determined

The above results show that only polymers containing both the halohydrin group and amine salt group monomer cured after the pH was adjusted, with the polymers containing the tertiary amine salt curing more rapidly. The polymer solutions that did not gel were still stable after 10 days.

To further demonstrate the rapid, low-temperature crosslinking of the polymers herein, 10 mil films were cast from the above polymer solutions after the pH had been adjusted to 9.5 as above. The films were dried for 1 hr. at 50° and 90° C. respectively, and the solubility of the dried films in water was deterined. The results are shown below.

| | | Solubility of Polymer Films Dried At | |
|---|---|---|---|
| Designation | Composition (mole %) | 50° C. | 90° C. |
| Polymer | | | |
| G | CHPA/DMAPMA.HCl/DMDAAC (6/6/88) | Insoluble | Insoluble |
| H | CHPA/DMAEMA.HCl/DMDAAC (6/6/88) | Insoluble | Insoluble |
| I | CHPMA/DMAPMA.HCl/DMDAAC (3.3/5.7/91) | Insoluble | Insoluble |
| J | CHPA/N—MDAA.HCl/DMDAAC (5/10/84) | Insoluble | Insoluble |
| K | CHPA/DAA.HCl/DMDAAC (6/10/84) | Insoluble | Insoluble |
| L-2 | CHPMA/N—IPAPMA.H$_2$SO$_4$/DMDAAC (6/10/84) | Insoluble | N.D. |
| Comparative Polymers | | | |
| M | CHPA/DMDAAC (7/93) | Soluble | Insoluble |
| N | CHPMA/DMDAAC (7/93) | Soluble | Soluble |
| O | CHPA/DMDAAC/HEMA (6/88/6) | Soluble | Insoluble |
| P | CHPA/DMDAAC/AA (6/88/6) | Soluble | Insoluble |
| Q | DMAPMA.HCl/DMDAAC (7/93) | Soluble | Soluble |
| R | N—MDAA.HCl/DMDAAC (7/93) | Soluble | Soluble |
| S | DMDAAC (100) | N.D. | N.D. |

N.D. — not determined

The results show that only the polymers containing both the halohydrin group and amine salt group crosslinked (as indicated by the film insolubility after heat-curing) at the lower temperature. The polymers that contained the amine salt and no halohydrin group (Q and R) did not crosslink at either temperature. Three of the four polymers that contained the halohydrin group (M, O, and P) and no amine salt crosslinked only at the higher temperature.

EXAMPLE III

This example describes the preparation of a polymer (I) of 3-chloro-2-hydroxypropyl acrylate (CHPA), hydrochloride of dimethylaminopropyl methacryamide (DMAPMA.HCl), octyl acrylate (OA), and ethyl acrylate (EA) using an aqueous emulsion polymerization technique. The molar ratio of CHPA/DMAPMA.HCl/OA/EA was 1.0/1.0/5.5/92.5.

The following charges were prepared:

A—1.36 g. of nonyl phenol ethylene oxide adduct (Triton 305), 2.64 g. of nonyl phenol ethylene oxide adduct (Triton 45), 2.4 g. of ferrous sulfate (FeSO$_4$.7-H$_2$O) (0.1%), 0.048 g. t-butyl hydroperoxide, and 0.5 g. acetic acid in 160 g. water B—20 g. EA C—0.048 g. sodium bisulfite in 8 g. water D—17.6 g. Triton 305, 8 g. Triton 45, 6.0 g. CHPA, 6.0 g. DMAPMA, 4.2 g. HCl (37%), 340 g. EA, and 40 g. OA in 52 g. water E—0.43 g. t-butyl hydroperoxide in 20 g. water F—0.43 g. sodium bisulfite in 20 g. water Charge A was charged to a 1 l. round bottom flask fitted as in Example 1. It was purged with nitrogen for 30 min. and then charge B was added with good agitation. The internal temperature was raised to 35° C., charge C was added in one shot, and the temperature was raised to and held at 55° C. for 30 min. after completion of the addition. The latex contained 58% solids. The intrinsic viscosity of the polymer in tetrahydrofuran (THF) was 1.9 dl/g.

To cure the latex the pH was adjusted to 9.0–9.5 with 15% aqueous sodium sesquicarbonate solution. The latex was cast as a 10 mil film and dried for 1 hr. at 65° C. The film was no longer soluble in ethyl acetate after curing.

EXAMPLE IV

This example describes the preparation of a solution copolymer of 3-chloro-2-hydroxypropyl methacrylate (CHPMA) and the acetate salt of dimethylaminoethyl methacrylate (DMAEMA.HAc) (90.4/9.6 molar ratio). The polymerization was carried out in ethyl acetate using conventional solution polymerization techniques.

The following charges were prepared:

A—85 g. (0.48 mole) CHPMA, 8 g. (0.05 mole) DMAEMA, and 9 g. (0.15 mole) acetic acid in 100 g. ethyl acetate B—1.0 g. azoisobutyronitrile in 50 g. ethyl acetate Twenty percent each of charges A and B were charged to a 500 ml. round bottom flask fitted as in Example I except that only two addition funnels were used. The mixture was purged with nitrogen for 30 min., heated to reflux temperature (about 80° C.), and held at reflux for 15 min. The remaining charges were slowly and separately added over 2 hr. The mixture was held at reflux for 2 hr. after the slow addition was completed and then cooled. The final polymer solution contained 41% solids. It was stable for over 6 months at room temperature.

Two other solution polymers were prepared using the above procedure and the monomers 3-chloro-2-hydroxypropyl acrylate (CHPA) and acetate salt of dimethylaminopropyl methacrylamide (DMAPMA.HAc) together with vinyl acetate (VAc), octyl acrylate (OA), and butyl acrylate (BA). The polymer composition and intrinsic viscosity in ethyl acetate are given below.

| | Polymer | |
|---|---|---|
| Designation | Composition (mole %) | I.V. (dl/g) |
| T | CHPMA/DMAEMA.HAc (90.4/9.6) | 0.11 |
| U | CHPA/DMAPMA.HAc/VAc/OA (2.6/4.7/24.6/68.1) | 0.39 |
| V | CHPA/DMAPMA.HAc/BA (2.4/4.6/93) | 0.44 |

To cure the polymers 5% of triethylamine or tributylamine (based on total of polymer solution) were added. Polymer films (10 mils) were cast and dried. After 2 hr. at 65° C. the films were insoluble in ethyl acetate indicating crosslinking had occurred. Prior to heating the films were soluble in the ethyl acetate.

EXAMPLE V

The comparative polymers designated W and X were prepared using the solution polymerization technique of Example IV. The polymers were similar to the polymer designated V except that neither contained both the halohydrin monomer and tertiary amine salt monomer. W contained butylacrylate (BA) and 3-chloro-2-hydroxypropyl acrylate (CHPA); X contained butyl acrylate and the acetate salt of dimethylaminopropyl methacrylamide (DMAPMA.HAc).

The polymers were cured, cast, dried, and evaluated for crosslinking as in Example II. The solubility results are shown below and compared with those for polymer U of Example III.

| Designation | Composition (mole %) | I.V. (dl/g) | Solubility of Polymer Films Dried at 65° for 2 hr. |
|---|---|---|---|
| | Polymer | | |
| V | CHPA/DMAPMA.HAc/BA (2.4/4.6/93) | 0.44 | Insoluble |
| | Comparative Polymers | | |
| W | CHPA/BA (4.5/95.5) | 0.24 | Soluble |
| X | DMAPMA.HAc/BA (4.5/95.5) | 0.34 | Soluble |

The results show that the polymer containing both the halohydrin and tertiary amine salt monomers (Polymer U) was insoluble after curing whereas the polymers which did not contain both monomers remained soluble, indicating no crosslinking occurred.

EXAMPLE VI

This example compares the amount of insoluble polymer formed when a base-catalyzed self-crosslinking monomer is used instead of the conventional acid-catalyzed self-crosslinking monomer in an electroconductive dimethyldiallyl ammonium chloride (DMDAAC) polymer.

The base-catalyzed water-soluble polymer, which contained 5% CHPA, 6% DMAPMA.HCl, 87% DMDAA, and 2% acrylic acid (AA), was prepared as in Example I. The acid-catalyzed water-soluble polymer used for comparison was a polymer of DMDAAC and N-methylol acrylamide (NMA). Dimethyl diallyl ammonium chloride polymer (DMDAAC) containing no crosslinking monomer was included for comparison. The polymer solutions at 40% solids were catalyzed to the indicated pH using sodium sesquicarbonate for the base (i.e., alkaline) cure and hydrochloric acid for the acid cure. Films (6 mil on glass) were cast within 1 hr. of catalysis. The films were dried at room temperature for 2 hours and then for 10 minutes at 60° C. Curing was carried out at the indicated time and temperature. The percentage of insolubles were measured after refluxing the films for 2 hours in distilled water.

| Designation | Polymer Composition (mole %) | % Insolubles After Curing | | | |
|---|---|---|---|---|---|
| | | pH | 2 min./93° C. | 5 min./93° C. | 5 min./107° C. |
| Y | CHPA/6% DMAPMA.HCl DMDAAC/AA (5/16/87/2) | 8.5 | 36.5% | 36.6% | 31.9% |

-continued

| Designation | Polymer Composition (mole %) | pH | % Insolubles After Curing | | |
|---|---|---|---|---|---|
| | | | 2 min./93° C. | 5 min./93° C. | 5 min./107° C. |
| Y | CHPA/6% DMAPMA.HCl DMDAAC/AA (5/6/87/2) | 9.5 | N.D. | 23.2% | 21.4% |
| (Comparative) | NMA/DMDAAC | 4.6 | 22.5% | 27.7% | 19.6% |
| (Control) | DMDAAC | 4.6 | 0 | 0 | 0 |

N.D. — not determined.

The results show that the CHPA- and NMA-containing polymers crosslinked after base and acid catalysis, respectively, as shown by the percentage insolubles in comparison with the control.

EXAMPLE VII

This example shows that polymers prepared with the base-catalyzed self-crosslinking monomers (i.e., CHPA and CHPMA) and DMDAAC were satisfactory in surface electrical resistivity when used as an electroconductive coating for paper. The polymers are described in Example II. The 30% polymer solutions were adjusted to pH 8.5 with 15% aqueous sodium sesquicarbonate and used to coat 45 lb. Bond paper at 2 lb. of polymer/3000 ft.$^2$. The surface electrical resistivity (SER), toluene holdout, surface tack, and remoistenability were determined using the testing procedure previously described.

The polymer designated Y was evaluated for surface electrical resistivity using a variation of the standard testing procedure where it was air dried instead of oven dried. The results given below show a comparison with the air dried, acid catalyzed DMDAAC polymer containing the crosslinking monomer NMA.

| Designation | Composition | SER in ohms | | |
|---|---|---|---|---|
| | | 20% R.H. | 50% R.H. | 80% R.H. |
| Y | CHPA/DMAPMA.HCl/DMDAAC/2% AA (5/6/87/2) | $5 \times 10^6$ | $2 \times 10^7$ | $2 \times 10^6$ |
| Comparative | NMA—DMDAAC | $3 \times 10^6$ | $6 \times 10^6$ | $7 \times 10^5$ |

The results show the polymers were comparable. The self-crosslinking polymer containing the halohydrin has the advantage that it is alkaline curable, whereas, the comparative self-crosslinking polymer requires an acid cure.

EXAMPLE VIII

This example shows the use of other water-soluble conductive polymers which are alkaline curable as electroconductive coatings for paper substrates. The following polymers were prepared using the procedure of Example I. The conductive monomers used in place of the non-ionic CHPA or CHPMA monomers were the quarternary ammonium adducts of dimethylaminopropyl methacrylamide (DMAPMA) and epichlorohydrin (EPI) and of dimethylaminoethyl methacrylate (DMAEMA) and epichlorohydrin.

The test results are shown below:

| Designation | Polymer Composition (mole %) | SER in ohms (% moisture) | | |
|---|---|---|---|---|
| | | 20% R.H. | 50% R.H. | 80% R.H. |
| G-2 | CHPA/DMAPMA.HCl/DMDAAC (7/6/87) | $3 \times 10^7$ (2.7%) | $4 \times 10^7$ (4.3%) | $5 \times 10^6$ (9.1%) |
| G-4 | CHPA/DMAPMA.HCl/DMDAAC (15/10/75) | $2 \times 10^7$ (2.8%) | $9 \times 10^6$ (6.2%) | $3 \times 10^6$ (7.1%) |
| G-5 | CHPA/DMAPMA.HCl/DMDAAC (20/10/70) | $7 \times 10^8$ (2.1%) | $7 \times 10^7$ (7.1%) | $7 \times 10^6$ (8.2%) |
| H-1 | CHPA/DMAEMA.HCl/DMDAAC (4/3/93) | $2 \times 10^8$ (3.4%) | $6 \times 10^7$ (5.8%) | $9 \times 10^6$ (7.8%) |
| I-1 | CHPA/DMAPMA.HCl/DMDAAC (3/2/94) | $4 \times 10^7$ (2.5%) | $9 \times 10^7$ (6.7%) | $2 \times 10^7$ (8.4%) |
| I-2 | CHPMA/DMAPMA.HCl/DMDAAC (3/6/91) | $3 \times 10^7$ (1.8%) | $5 \times 10^6$ (7.3%) | $7 \times 10^5$ (8.9%) |
| Y | CHPA/DMAPMA.HCl/DMDAAC/AA (5/6/87/2) | $4 \times 10^6$ (3.7%) | $6 \times 10^7$ (5.6%) | $2 \times 10^6$ (9.4%) |
| control | DMDAAC | $2 \times 10^7$ (3.6%) | $8 \times 10^6$ (4.7%) | $2 \times 10^6$ (8.7%) |
| Comparative | NMA/DMDAAC (acid-catalyzed) | $1 \times 10^6$ (3.1%) | $3 \times 10^6$ (5.8%) | $8 \times 10^6$ (8.7%) |

| Polymer Desig. | Composition (mole %) | % Penetration of Toluene | Surface Tack | Remoistenability |
|---|---|---|---|---|
| G-3 | CHPA/DMAPMA.HCl/DMDAAC (12/7/81) | N.D. | 9 | 9 |
| G-5 | CHPA/DMAPMA.HCl/DMDAAC (20/10/70) | 6 | 10 | 9 |
| I-2 | CHPMA/DMAPMA.HCl/DMDAAC (3/6/91) | 6 | N.D. | N.D. |
| Poly DMDAAC (control) | | 40 | 6 | 4 |

The results show that the polymers have better toluene holdout, surface tack, and remoistenability than the DMDAAC control without a crosslinking monomer and that they have comparable SER values to the DMDAAC control and the comparative conductive DMDAAC polymer with the crosslinking monomer NMA.

| Designation | Polymer (mole % - gel time) | SER in ohms (% moisture) | | |
|---|---|---|---|---|
| | | 20% R.H. | 50% R.H. | 80% R.H. |
| Z-1 | DMAPMA—Epi/DMAPMA.HCl/DMDAAC (3/4/93% - 6.5 hr.) | 4 × 10⁷ (2.2%) | 5 × 10⁷ (6.3%) | 6 × 10⁶ (9.6%) |
| Z-2 | DMAPMA—Epi/DMAPMA.HCl/DMDAAC (9/3/88% - 27 hr.) | 6 × 10⁷ (2.3%) | 3 × 10⁷ (7.4%) | 5 × 10⁶ (9.8%) |
| Z-3 | DMAPMA—Epi/N—MDAA.HCl/DMDAAC (3/4/93% - 16 hr.) | N.D. | N.D. | N.D. |
| Z-4 | DMAEMA—Epi/DMAPMA.HCl/DMDAAC (3/4/93% - 17 hr.) | 4 × 10⁷ (3.1%) | 7 × 10⁶ (6.8%) | 9 × 10⁵ (9.2%) |
| Z-5 | DMAEMA—Epi/DMAEMA.HCl/DMDAAC (3/4/93% - 30 hr.) | 9 × 10⁷ (2.9%) | 9 × 10⁶ (6.4%) | 3 × 10⁶ (9.2%) |
| Control | DMDAAC | 2 × 10⁷ (3/6%) | 8 × 10⁶ (4/7%) | 2 × 10⁶ (8.7%) |

| Polymer | % Penetration in Toluene | Surface Tack | Remoistenability |
|---|---|---|---|
| Z-1 | 2 | 9 | 8 |
| Z-5 | 2 | 9 | 9 |
| DMDAAC (Control) | 40 | 6 | 4 |

The results show that the polymers have better toluene holdout, surface tack, and remoistenability than the poly DMDAAC control without a crosslinking monomer and that they have comparable SER values.

What is claimed is:

1. A low temperature curable, base-catalyzed, self-crosslinking polymer, which consists essentially of (a) about 1–15 mole % of a halohydrin monomer having the formula

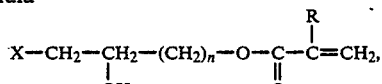

where R is H or CH₃; (b) about 1–25 mole % of a secondary or tertiary amine salt monomer having the formula

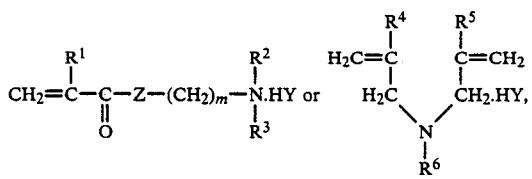

where $R^1$ is H or CH₃, $R^2$ is H when $R^3$ is a $C_1$–$C_4$ linear alkyl, or $R^2$ and $R^3$ are independently a lower alkyl $R^3$ is H when $R^2$ is a $C_1$–$C_4$ linear alkyl, $R^4$, $R^5$, and $R^6$ are independently H or a $C_1$–$C_4$ linear alkyl, n is 1, m is 2 or 3, X is chlorine, bromine, or iodine, Z is —NH— or —O—, and HY is an organic or inorganic acid; and (c) about 65–98 mole % of a vinyl polymerizable monomer other than (a) or (b), with the mole percentage totaling 100%, wherein the polymer crosslinks, in the presence of a base, at a lower temperature than a polymer without (b).

2. The polymer of claim 1, wherein $R^2$, $R^3$, $R^4$, $R^5$ and $R^6$ are methyl and wherein X is chlorine.

3. The polymer of claim 1, wherein the halohydrin monomer is 3-chloro-2-hydroxypropyl acrylate or methacrylate and wherein the amine salt monomer is a secondary amine salt selected from the group consisting of diallylamine hydrochloride or N-isopropylaminopropyl methacrylamide hydrogen sulfate and/or a tertiary amine salt selected from the group consisting of dimethylaminopropyl methacrylamide hydrochloride or dimethylaminoethyl methacrylate hydrochloride or acetate.

4. The polymer of claim 3, wherein the vinyl polymerizable monomer is dimethyl diallyl ammonium chloride, 2-acrylamido-2-methylpropane sulfonic acid, N-(2-methacryloylethyl) trimethyl ammonium chloride, vinyl acetate, octyl acrylate, butyl acrylate, and/or ethyl acrylate.

5. The polymer of claim 1, which is prepared by aqueous solution polymerization and wherein the halohydrin monomer is 3-chloro-2-hydroxypropyl acrylate or methacrylate, the amine salt monomer is the secondary amine diallylamine hydrochloride or N-isopropylaminopropyl methacrylamide hydrogen sulfate and/or the tertiary amine monomer diethylaminopropyl methacrylamide hydrochloride or dimethylaminoethyl methacrylate hydrochloride or acetate, and the vinyl polymerizable monomer is dimethyl diallyl ammonium chloride, 2-acrylamido-2-methylpropane sulfonic acid, N-(2-methacryloylethyl)trimethyl ammonium chloride, vinyl acetate, octyl acrylate, butyl acrylate, and/or ethyl acrylate.

6. The polymer of claim 5, wherein the polymer consists essentially of 15% 3-chloro-2-hydroxypropyl acrylate, 10% dimethylaminopropyl methacrylamide hydrochloride, and 75% dimethyl diallyl ammonium chloride; 2% 3-chloro-2-hydroxypropyl methacrylate, 2% dimethylaminopropyl methacrylamide hydrochloride, 96% dimethyl diallyl ammonium chloride; 2% 3-chloro-2-hydroxypropylacrylate, 2% dimethylaminopropyl methacrylamide hydrochloride, and 96% 2-acrylamido-2-methylpropene sulfonic acid; 12% 3-chloro-2-hydroxypropyl methacrylate, 17% aminoethyl methacrylate hydrochloride and 71% N-(2-methacryloylethyl)trimethyl ammonium chloride; 10% 3-chloro-2-hydroxypropyl methacrylate, 25% dimethylaminopropyl methacrylamide hydrochloride, and 65% acrylamide; 6% 3-chloro-2-hydroxypropyl acrylate, 6% dimethylaminopropyl methacrylamide hydrochloride, and 88% dimethyl diallyl ammonium chloride; 6% 3-chloro-2-hydroxypropyl acrylate, 6% dimethylaminopropyl methacrylate hydrochloride, and 88% dimethyl diallyl ammonium chloride; 3.3% 3-chloro-2-hydroxypropyl methacrylamide, 5.7% dimethylaminopropyl methacrylamide hydrochloride, and 91% dimethyl diallyl ammonium chloride; 6% 3-chloro-2-hydroxypropyl acrylate, 10% N-methyl diallylamine hydrochloride or N-isopropylaminopropyl methacryl amide hydrogen sulfate, and 84% dimethyl diallyl ammonium chloride; or 5% 3-chloro-2-hydroxypropyl methacrylate and 95% dimethylaminopropyl methacrylamide hydrochloride.

7. The polymer of claim 1 which is prepared by solution polymerization in an organic solvent and wherein the halohydrin monomer is 3-chloro-2-hydroxypropyl acrylate or methacrylate, the amine salt monomer is dimethylaminopropyl methacrylamide acetate or dimethylaminoethyl methacrylate acetate, and the vinyl polymerizable monomer is vinyl acetate, octyl acrylate, and/or butyl acrylate.

8. The polymer of claim 7, wherein the polymer consists of 2.6% 3-chloro-2-hydroxypropyl acrylate, 4.7% dimethylaminopropyl methacrylamide acetate, 24.6% vinyl acetate, and 68.1% octyl acrylate or 2.4% 3-chloro-2-hydroxypropyl acrylate, 4.6% dimethylaminopropyl methacrylamide acetate, and 93% butyl acrylate.

9. The polymer of claim 1, which is prepared by aqueous emulsion polymerization and wherein halohydrin monomer is 3-chloro-2-hydroxypropyl acrylate or methacrylate, wherein the amine salt monomer is dimethylaminopropyl methacrylamide hydrochloride or dimethylaminoethyl methacrylate hydrochloride, and wherein the vinyl polymerizable monomer is octyl acrylate and/or butyl acrylate.

10. A low temperature curable, base-catalyzed self-crosslinking polymer, which consists essentially of (a) about 5–91 mole % of a halohydrin monomer having the formula

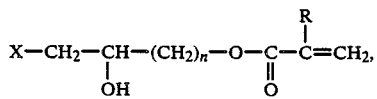

where R is H or CH$_3$; and (b) about 9–95 mole % of a secondary and/or tertiary amine salt monomer having the formula

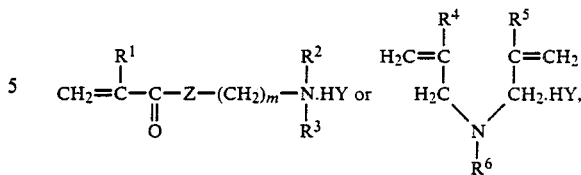

where R$^1$ is H or CH$_3$, R$^2$ is H when R$^3$ is a C$_1$–C$_4$ linear alkyl, or R$^2$ and R$^3$ are independently a lower alkyl R$^3$ is H when R$^2$ is a C$_1$–C$_4$ linear alkyl, R$^4$, R$^5$, and R$^6$ are independently H or a C$_1$–C$_4$ linear alkyl, n is 1, m is 2 or 3, X is chlorine, bromine, or iodine, Z is —NH— or —O—, and HY is an organic or inorganic acid, with the mole percentage totaling 100%; wherein the polymer crosslinks, in the presence of a base, at a lower temperature than a polymer without (b).

11. (new) The polymer of claim 10, wherein R$^2$, R$^3$, R$^4$, R$^5$ and R$^6$ are methyl and wherein X is chlorine.

12. The polymer of claim 10, wherein the halohydrin monomer of (a) is 3-chloro-2-hydroxypropyl acrylate or methacrylate and wherein the amine salt monomer of (b) is the secondary amine salt selected from the group consisting of diallylamine hydrochloride or N-isopropylaminopropyl methacrylamide hydrogen sulfate and/or the tertiary amine salt selected from the group consisting of dimethylaminopropyl methacrylamide hydrochloride or dimethylaminoethyl methacrylate hydrochloride or acetate.

13. The polymer of claim 12, wherein the halohydrin monomer is 3-chloro-2-hydroxypropyl methacrylate present in an amount of about 5 mole % and the tertiary amine salt monomer is dimethylaminopropyl methacrylamide hydrochloride present in an amount of about 95% or wherein the halohydrin monomer is 3-chloro-2-hydroxypropyl methacrylate present in an amount of about 90 mole % and the tertiary amine salt monomer is dimethylaminoethyl methacrylate acetate present in an amount of about 10 mole %.

* * * * *